United States Patent [19]
Hicok et al.

[11] Patent Number: 5,557,733
[45] Date of Patent: Sep. 17, 1996

[54] CACHING FIFO AND METHOD THEREFOR

[75] Inventors: Gary D. Hicok, Mesa; Judson A. Lehman, Scottsdale, both of Ariz.

[73] Assignee: VLSI Technology, Inc., San Jose, Calif.

[21] Appl. No.: 42,306

[22] Filed: Apr. 2, 1993

[51] Int. Cl.$^6$ .................................................. G06F 15/00
[52] U.S. Cl. .......................................... 395/162; 395/164
[58] Field of Search ...................................... 345/114, 119, 345/152, 172, 173, 182, 189, 190, 200; 365/189.03, 189.04, 189.05, 201, 230.05; 395/100, 129, 131, 132, 143, 157, 162, 164, 166, 163, 250, 275, 500, 325, 425, 700, 800

[56] References Cited

U.S. PATENT DOCUMENTS

| | | | |
|---|---|---|---|
| 4,891,794 | 1/1990 | Hugh et al. | 365/189.04 |
| 5,040,150 | 8/1991 | Naitoh et al. | 365/201 |
| 5,130,981 | 7/1992 | Murphy | 370/85.6 |
| 5,241,631 | 8/1993 | Smith et al. | 395/325 |
| 5,249,266 | 9/1993 | Dye et al. | 395/162 |
| 5,261,059 | 11/1993 | Hedberg et al. | 395/325 |
| 5,269,021 | 12/1993 | Denio et al. | 395/700 |
| 5,276,849 | 1/1994 | Patel | 395/425 |
| 5,297,271 | 3/1994 | Bhayani | 395/425 |
| 5,299,309 | 3/1994 | Kuo et al. | 395/162 |

OTHER PUBLICATIONS

D. Bursky et al., "The Best of '90", Electronic Design, v38, n24, Dec. 1990, p37(12).
N. Wirth et al., "A Triple–Port Field Memory for Digital Video Processing", IEEE Transactions on Consumer Electronics, vol. 37, No. 3, Aug. 1991, pp. 598–603.

Primary Examiner—Mark R. Powell
Assistant Examiner—U. Chauhan
Attorney, Agent, or Firm—Harry M. Weiss; Jeffrey D. Moy; Harry M. Weiss & Associates, P.C.

[57] ABSTRACT

A memory subsystem for use between a CPU and a graphics controller in a typical small computer system has a cache interface for the CPU and a FIFO interface for the graphics controller. This configuration optimizes the data transfers for both the CPU and the graphics controller, and allows both to operate in a manner generally asynchronous to each other. This caching FIFO provides enhanced performance by matching the interface to the unique data requirements of the devices accessing the data within the caching FIFO. For the CPU, the caching FIFO appears as a normal data cache. For the graphics controller, the caching FIFO appears as a normal dual port FIFO, which optimizes the highly sequential data transfers characteristic of graphics controllers. The simple design of the caching FIFO provides maximum performance for a minimum of gates, making the circuit well-suited to efficient implementation in silicon.

7 Claims, 1 Drawing Sheet ated in the

CACHING FIFO AND METHOD THEREFOR

BACKGROUND OF THE INVENTION

1. Field of the Invention

This invention generally relates to memory subsystems in a computer system such as cache memory, and, more specifically, relates to a memory subsystem placed between a CPU and a display controller that operates like a cache in relation to the CPU and operates like a dual port First In, First Out memory (FIFO) in relation to the display controller.

2. Description of the Related Art

Caches, write buffers, and read buffers have been extensively used to increase the performance of CPU bus transfers in computer systems. Caches are the most complicated and generally the most effective. However, they are designed to optimize CPU data and code accesses. This is often not an efficient design for use with a graphics controller.

Write buffers optimize write transfers. A graphics controller performs mostly write transfers, and hence can benefit from using a write buffer. Although write transfers encompass a significant portion of the graphics transfers, it is not effective for reads or read-modify-write cycles, which the graphics controller must also perform. Read buffers optimize read transfers. However, the memory associated with read buffers is not well utilized, since the read cycles comprise a minority of transfers done by a graphics controller.

The most common transfers for graphics controllers are sequential writes, sequential reads, sequential read-modify-writes, and sequential read-read-modify-writes. Today most CPU bus graphics controllers utilize a write buffer, and a few also have a read buffer. The write buffer will accommodate the sequential write cycles, the read buffer will accommodate the sequential read cycles, and the combination of the write buffer and the read buffer will accommodate the rest of the cycles. The critical problem is that using both a write buffer and a read buffer takes up a substantial amount of silicon, since each buffer must have its own dedicated memory. Thus the size of the memories associated with these write and read buffers causes for an inefficient use of silicon.

A cache memory is best suited to solve the problem of having double the memory associated with having both a write buffer and a read buffer, since the memory in a cache can be used as a read or a write location. A cache memory would thus take substantially less silicon to implement. However, a typical VGA graphics controller contains a modifying write path. This means that data would be read by the graphics controller, modified, and written back to the cache. Most cache architectures are not suited to handle this modifying feature that occurs in a highly sequential nature in graphics controllers. In addition, standard caches used with CPUs are relatively complex.

Therefore, there existed a need to provide a memory subsystem for use with a graphics controller which is optimized for sequential transfers, which can easily handle the modifying write path during read-modify-write and read-read-modify-write cycles, which optimizes transfers to the CPU, and which is less complex than a standard cache due to the highly sequential nature of accesses associated with graphics controllers.

SUMMARY OF THE INVENTION

It is an object of this invention to provide a memory subsystem which has one interface that looks like a standard cache to the CPU and which has another interface which appears as a dual port FIFO to the graphics controller.

It is another object of this invention to provide a memory subsystem which has one interface that looks like a standard cache to the CPU and which has another interface which appears as a dual port FIFO to the graphics controller, and which allows the CPU and graphics controller to store and retrieve data to the memory in a manner substantially asynchronous to each other.

According to the present invention, a memory subsystem known as a caching FIFO is provided to improve the speed of data transfers between a CPU and a graphics controller in a typical small computer system. This caching FIFO has memory which can be both written and read by the CPU and the graphics controller. The interface to the CPU makes the Caching FIFO appear to the CPU as a conventional cache. The interface to the graphics controller makes the Caching FIFO appear to the graphics controller as a dual port FIFO. The highly sequential nature of graphics transfers coupled with the modifying write path during read-modify-write and read-read-modify-write cycles make the dual port FIFO interface to the graphics controller very efficient. This same data stored by the graphics controller is accessible to the CPU via the cache interface, which accesses this data much the same as is would using conventional cache. During normal operation the cache interface and the FIFO interface operate asynchronously to each other. The only exception is when one interface has to pause to receive data directly from the other, which rarely occurs during normal operation.

The Caching FIFO has Cache Logic and FIFO Logic coupled to a three-port Random Access Memory (RAM) which allows accessing the data within the RAM by all three ports. The first port is used to read cache data from the RAM, the second is used to read FIFO data from the RAM, and the third is used to write both cache and FIFO data to the RAM. A latch and two external multiplexers (MUXs) are controlled by the Cache Logic and the FIFO Logic to provide the proper path for the data access being performed.

The combination of Cache Logic and FIFO Logic provide interface signals to make the Caching FIFO appear as a regular cache to the CPU, and provides interface signals to make the Caching FIFO appear as a regular dual port FIFO to the Graphics Controller. In this manner the data transfers to and from the CPU and the Graphics Controller are optimized according to the specific needs and operational parameters of these devices. The Cache Interface to the CPU allows for efficiently transferring display data to and from the CPU, while the FIFO interface to the Graphics Controller allows for quickly transferring large blocks of sequential display data very quickly and efficiently.

The foregoing and other objects, features and advantages will be apparent from the following description of the preferred embodiment of the invention as illustrated in the accompanying drawings.

DESCRIPTION OF THE PREFERRED EMBODIMENT

Figure 1:
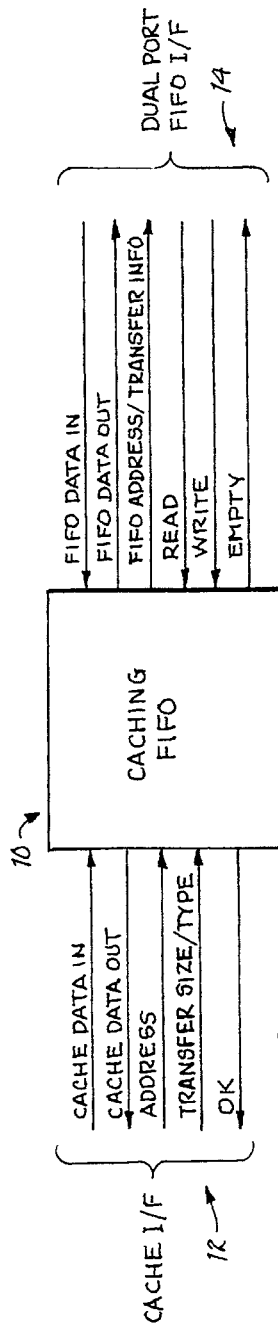
FIG. 1 is a block diagram of the Caching Fifo of the present invention.

FIG. 1 shows a simple block diagram representation of the memory subsystem of the present invention, called herein a Caching FIFO 10. The Caching FIFO 10 has a Cache Interface (I/F) 12 which is typically coupled to the CPU in a small computer system and a Dual Port FIFO I/F 14 which is typically coupled to the graphics controller in this same computer system. The Cache I/F 12 comprises a parallel data write path called Cache Data In, a parallel data read path called Cache Data Out, Address inputs, control inputs called Transfer Size/Type, and an OK status signal. These signals provided on the Cache I/F 12 of Caching FIFO 10 allow the Caching FIFO 10 to operate as a standard cache in relation to the CPU in this typical small computer system.

The Dual Port FIFO I/F 14 comprises a parallel data write path called FIFO Data In, a parallel data read path called FIFO Data Out, status outputs indicating FIFO Address/ Transfer Info, READ and WRITE inputs to indicate whether the transfer is a read or a write, respectively, and an Empty status line which indicates to the graphics controller when the FIFO is empty. These signals provided on the Dual Port FIFO I/F 14 of Caching FIFO 10 allow the Caching FIFO 10 to operate as a standard dual port FIFO in relation to the graphics controller in this typical small computer system.

Figure 2:
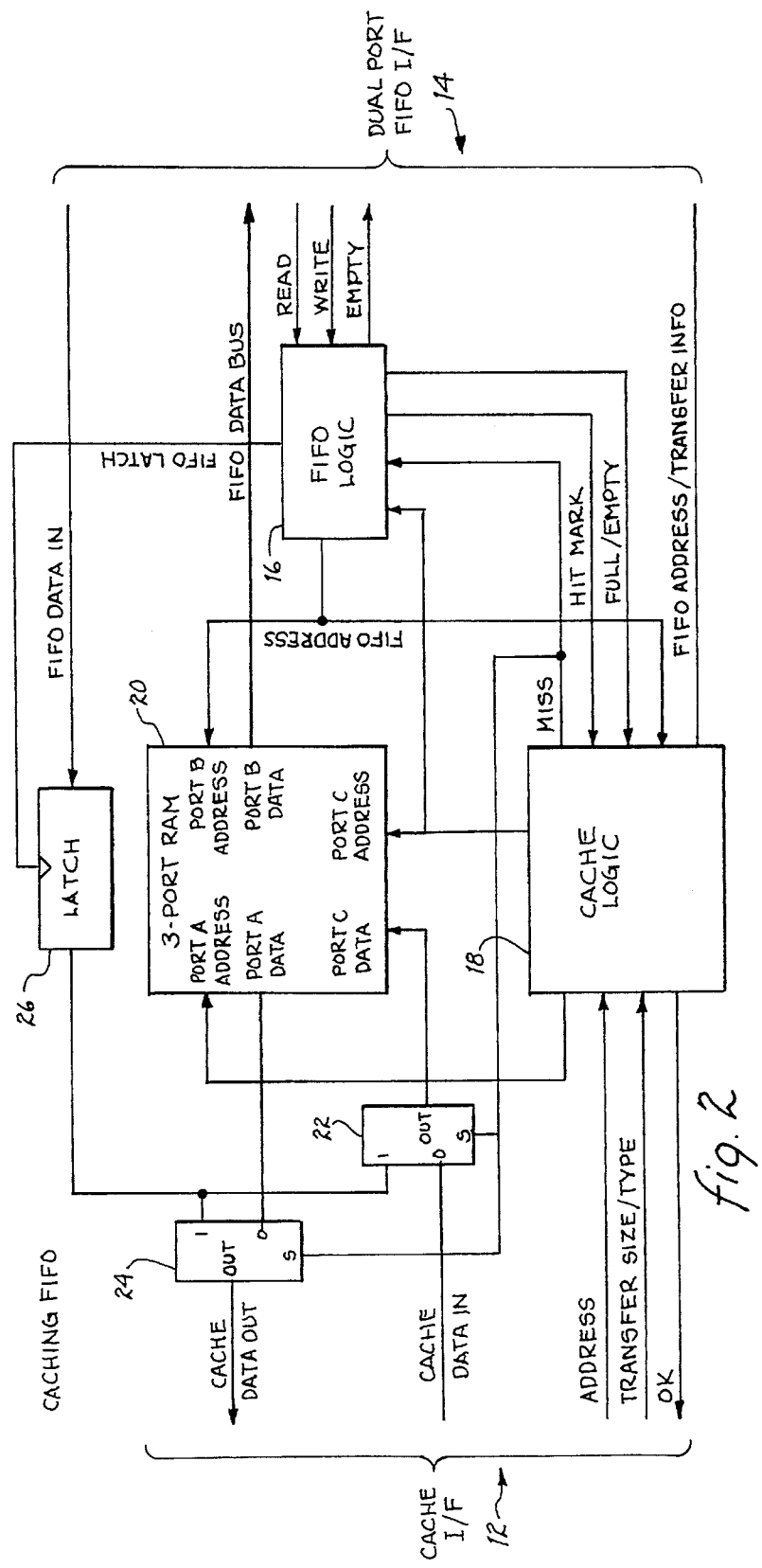
FIG. 2 is a block diagram of the internal configuration of the Caching FIFO of FIG. 1.

FIG. 2 shows the detailed internal configuration of the Caching FIFO 10 of FIG. 1. FIFO Logic 16 and Cache Logic 18 comprise the control logic to provide most of the signals for both the Cache I/F 12 and the Dual Port FIFO I/F 14. The Caching FIFO 10 has a 3-Port RAM 20 where the data to be transferred between the CPU and the graphics controller is temporarily stored. Also included are an Input Multiplexer (MUX) 22, an Output MUX 24 and a Latch 26 to control the flow of data into and out of the 3-Port RAM 20. Note that, on 3-Port RAM 20, Port A is dedicated to cache reads, Port B is dedicated to FIFO reads, and Port C is dedicated to both cache and FIFO writes.

OPERATION

When the CPU has data to write to the graphics controller, the CPU transfers the data to the Cache Data In bus, asserts the proper address value on the Address inputs to Cache Logic 18, and tells Cache Logic 18 that the transfer is a write and the size of the transfer via the Transfer Size/Type inputs. Cache Logic 18 then negates its MISS output to Input MUX 22 to route the data on the Cache Data In lines to the Port C Data inputs of 3-Port RAM 20, and at the same time Cache Logic 18 also drives the Port C Address lines with the appropriate address. Cache Logic 18 continues this operation until all data specified by the Transfer Size/Type inputs has been written to 3-Port RAM 20. Note that the FIFO Logic 16 also monitors the Port C Address lines to keep track of what data the Cache Logic 18 has stored in the 3-Port RAM 20.

When the CPU needs to read data from the graphics controller, it tells the Cache Logic 18 that the transfer is a read and the size of the transfer via the Transfer Size/Type inputs, while driving the address of the first read transfer on the Address input lines. The Cache Logic 18 then checks its internal address registers to see if the desired data is stored in the 3-Port RAM 20. If the data exists within 3-Port RAM 20, Cache Logic 18 negates MISS and asserts the appropriate address on the Port A Address lines. With MISS negated, Output MUX 24 directs the data on the Port A Data lines to the Cache Data Out lines, which are read by the CPU when the OK line is asserted by the Cache Logic 18.

If the desired data does not exist within the 3-Port RAM 20, Cache Logic 18 asserts MISS, which causes the data from Latch 26 to be routed through Output MUX 24 to the Cache Data Out lines. At this point in time the Latch 26 probably does not contain the desired data. But as soon as this data is transferred via the FIFO I/F 14 to Latch 26, FIFO Logic 16 signals this to Cache Logic 18 with the HITMARK signal. This in turn causes the Cache Logic 18 to assert the OK status output, signalling to the CPU that the data on the Cache Data Out lines is now the desired data. This continues until the number of transfers specified on the Transfer Size and Type inputs has been completed.

Note that the MISS signal generated by Cache Logic 18 is always asserted unless the CPU is writing data to the 3-Port RAM 20 or the CPU is reading data which exists already in the 3-Port RAM 20. With the exception of these two cases, MISS is constantly asserted.

When the graphics controller has data to write to the CPU, it places the data on the FIFO Data In lines and asserts the WRITE input to FIFO Logic 16 to signal that this is a write transfer. FIFO Logic 16 then asserts its FIFO Latch output, which stores the data on the FIFO Data In lines in Latch 26. Since the MISS output from Cache Logic 18 is asserted, Input MUX 22 routes the data stored in Latch 26 to the Port C Data lines. Cache Logic 18 also puts out the appropriate address to the Port C Address of 3-Port RAM 20 based on the address it sees from the FIFO Address output of FIFO Logic 16. In this manner the data on the FIFO Data In lines is stored in the 3-Port RAM 20.

When the graphics controller has data to read from the CPU, it asserts the READ signal to FIFO Logic 16, which then puts out the appropriate address on the FIFO Address lines, which in turn drive the Port B Address lines. The 3-Port RAM 20 then outputs the desired data on the Port B Data lines, which drive the FIFO Data Out lines to the graphics controller.

During both FIFO reads and FIFO writes, the graphics controller can monitor the status of the transfers via the FIFO Address/Transfer Info status lines. Note that the write and read transfers through the Dual Port FIFO I/F 14 described above are conditioned on the 3-Port RAM 20 not being full (in the case of a write), or on the 3-Port RAM 20 not being empty (in the case of a read). Cache Logic 18 monitors the Empty/Full status lines from FIFO Logic 16 to determine whether either of these conditions exist, and reports this status on the FIFO Address/Transfer Info lines, to allow the graphics controller to delay the transfers until the conditions in the 3-Port RAM 20 allow the data transfer to proceed.

Having separate read ports (Ports A and B) and a separate write port (Port C) on 3-Port RAM 20 allows the Cache I/F 12 to operate asynchronously to Dual Port FIFO I/F 14 during normal operation. In addition, this configuration shown in FIG. 2 is much simpler than a conventional cache memory subsystem, allowing the Caching FIFO 10 of the present invention to be efficiently implemented in silicon with a minimum number of gates.

While the invention has been described in its preferred embodiment, it is to be understood that the words which have been used are words of description rather than limitation, and that changes may be made within the purview of the appended claims without departing from the true scope and spirit of the invention in its broader aspects.

What is claimed is:

1. A memory subsystem for transferring data between a CPU and a graphics controller in a small computer system comprising, in combination:

Random Access Memory (RAM) means for storing said data;

first interface means coupled to said CPU and to said RAM means for providing a cache interface for transferring said data from said CPU to said RAM means and from said RAM means to said CPU; and second interface means coupled to said graphics controller and to said RAM means for providing a dual port First-In-First-Out (FIFO) interface for transferring said data from said graphics controller to said RAM means and from said RAM means to said graphics controller.

2. The memory subsystem of claim 1 wherein said RAM means comprising a three port RAM having a first port dedicated to reading said data from said RAM means by said CPU, having a second port dedicated to reading said data from said RAM means by said graphics controller, and having a third port dedicated to writing said data from said CPU and from said graphics controller into said RAM means.

3. The memory subsystem of claim 1 wherein said cache interface and said dual port FIFO interface together comprising:

cache logic means for controlling flow of said data during a CPU read from said RAM means and during a CPU write to said RAM means;

FIFO logic means for controlling flow of said data during a graphics controller read from said RAM means and during a graphics controller write to said RAM means;

latch means for storing said data during said graphics controller write to said RAM means; and multiplexer means for routing said data appropriately during said graphics controller write to said RAM means, during said CPU write to said RAM means, and during said CPU read from said RAM means.

4. A memory subsystem for transferring data between a CPU and a graphics controller in a small computer system comprising, in combination:

Random Access Memory (RAM) means for storing said data, comprising a three port RAM having a first port dedicated to reading said data from said RAM means by said CPU, having a second port dedicated to reading said data from said RAM means by said graphics controller, and having a third port dedicated to writing said data from said CPU and from said graphics controller into said RAM means;

first interface means coupled to said CPU and to said RAM means for providing a cache interface for transferring said data from said CPU to said RAM means and from said RAM means to said CPU; and second interface means coupled to said graphics controller and to said RAM means for providing a dual port First-In-First-Out (FIFO) interface for transferring said data from said graphics controller to said RAM means and from said RAM means to said graphics controller;

said cache interface and said dual port FIFO interface together comprising:

cache logic means for controlling flow of said data during a CPU read from said RAM means and during a CPU write to said RAM means;

FIFO logic means for controlling flow of said data during a graphics controller read from said RAM means and during a graphics controller write to said RAM means;

latch means for storing said data during said graphics controller write to said RAM means; and multiplexer means for routing said data appropriately during said graphics controller write to said RAM means, during said CPU write to said RAM means, and during said CPU read from said RAM means.

5. A method for transferring data between a CPU and a graphics controller in a small computer system including the steps of:

providing Random Access Memory (RAM) means for storing said data;

providing a cache interface for transferring said data from said CPU to said RAM means and from said RAM means to said CPU;

providing a dual port First-In-First-Out (FIFO) interface for transferring said data from said graphics controller to said RAM means and from said RAM means to said graphics controller;

transferring said data from said CPU to said RAM means through said cache interface;

transferring said data from said RAM means to said CPU through said cache interface;

transferring said data from said graphics controller to said RAM means through said dual port FIFO interface;

transferring said data from said RAM means to said graphics controller through said dual port FIFO interface;

said data transferring to and from said RAM means from said CPU and said data transferring to and from said RAM means from said graphics controller occurring substantially asynchronously to each other.

6. The method of claim 5 wherein said RAM means comprising a three port RAM having a first port dedicated to reading said data from said RAM means by said CPU, having a second port dedicated to reading said data from said RAM means by said graphics controller, and having a third port dedicated to writing said data from said CPU and from said graphics controller into said RAM means.

7. The method of claim 5 wherein said cache interface and said dual port FIFO interface together comprising:

cache logic means for controlling flow of said data during a CPU read from said RAM means and during a CPU write to said RAM means;

FIFO logic means for controlling flow of said data during a graphics controller read from said RAM means and during a graphics controller write to said RAM means;

latch means for storing said data during said graphics controller write to said RAM means; and multiplexer means for routing said data appropriately during said graphics controller write to said RAM means, during said CPU write to said RAM means, and during said CPU read from said RAM means.

* * * * *